United States Patent [19]
Oeckl et al.

[11] Patent Number: 4,853,135
[45] Date of Patent: Aug. 1, 1989

[54] CATALYST RESINS FOR THE CATALYTIC REDUCTION OF OXYGEN IN AQUEOUS MEDIA, THE PREPARATION OF THE CATALYST RESINS, AND NEW CATALYST RESINS

[75] Inventors: Siegfried Oeckl, Bergisch Gladbach; Friedrich Martinola, Cologne; Paul Thomas, Leverkusen, all of Fed. Rep. of Germany

[73] Assignee: Bayer Aktiengesellschaft, Leverkusen, Fed. Rep. of Germany

[21] Appl. No.: 47,222

[22] Filed: May 5, 1987

[30] Foreign Application Priority Data

May 23, 1986 [DE] Fed. Rep. of Germany ....... 3617273

[51] Int. Cl.$^4$ ............................................... C02F 1/70
[52] U.S. Cl. ..................................... 210/757; 502/159
[58] Field of Search ........................ 210/757; 502/159; 521/31

[56] References Cited

U.S. PATENT DOCUMENTS 4,145,486  3/1979  Haag et al. ............................. 521/31
4,574,071  3/1986  De Silva et al. ..................... 210/757

Primary Examiner—Ivars Cintins
Attorney, Agent, or Firm—Sprung Horn Kramer & Woods

[57] ABSTRACT

The invention relates to the use of macroporous weakly-basic anion exchangers, charged with palladium or platinum and based on crosslinked polystyrene, as catalysts for the removal of oxygen from aqueous media by catalytic reduction, a process for the preparation of these catalyst resins, and new macroporous weakly-basic anion exchangers, charged with palladium or platinum and based on crosslinked polystyrene, in which the amino groups are primary or secondary amino groups.

9 Claims, No Drawings

CATALYST RESINS FOR THE CATALYTIC REDUCTION OF OXYGEN IN AQUEOUS MEDIA, THE PREPARATION OF THE CATALYST RESINS, AND NEW CATALYST RESINS

The invention relates to the use of special catalyst resins for the catalytic reduction of oxygen in aqueous media, a process for the preparation of these catalyst resins, and new catalyst resins. Among experts and in the context of the present invention, ion exchangers, based on synthetic resins, which are charged with catalytically active metals are referred to as 'catalyst resins'.

Processes for the removal of oxygen from aqueous media by catalytic reduction of the oxygen using hydrogen, hydrazine or hypophosphite in the presence of catalyst resins are known (see, for example, EP-B-O, No. 065,687 and EP-A-O No., 140,587 and the publications mentioned in these patent specifications). Hitherto, strongly acidic cation exchangers, charged with palladium or platinum, and strongly basic anion exchangers, charged with palladium or platinum, have hitherto been used as catalyst resins in this process. In practice, however, it has been shown that the cation exchangers charged with palladium and platinum are inferior to the strongly basic anion exchangers charged with palladium or platinum since they release the noble metal more easily under the conditions of the oxygen removal from aqueous solutions and therefore lose catalytic activity more quickly. Strongly basic anion exchangers which are charged with palladium or platinum are therefore preferably used for the removal of oxygen from aqueous media. However, these catalyst resins are not yet satisfactory with respect to their thermal, mechanical and osmotic stability.

The object was, therefore, to develop catalyst resins which contain the catalytically active metals bonded adequately strongly under the conditions under which oxygen is removed from aqueous media by catalytic reduction using hydrogen, hydrazine or hypophosphite and which thus retain their catalytic activity on a long-term basis, even at high space velocity, and which additionally have the high thermal, mechanical and osmotic stability which is necessary for use.

It has been found that catalyst resins which contain catalytically active metals, such as palladium or platinum, bonded to macroporous weakly-basic anion exchangers based on crosslinked polystyrene have the properties which are necessary for successful use in the removal of oxygen from aqueous medium, high adhesion of the catalytically active metal with simulataneous high thermal, mechanical and osmotic stability.

Catalyst resins which contain catalytically active metals, such as palladium and platinum, bonded to macroporous weakly-basic anion exchangers based on crosslinked polysytrene are known (see U.S. Patent No. 4,111,856). However, they have only been used for catalytic reactions (carbonylation reactions, olefin isomerizations, hydroformylations, preparations of vinyl esters) which are totally different from the use intended according to the invention and in which the properties required for the catalytic reduction of oxygen in aqueous media, particularly the mechanical and osmotic stability, were neither in demand nor able to appear.

The invention thus relates to an improved process for the removal of oxygen from aqueous media by catalytic reduction of the oxygen using hydrogen, hydrazine or hypophosphite, preferably using hydrogen or hydrazine, using anion exchangers, charged with palladium or platinum, based on crosslinked polystyrene as catalysts, which is characterized in that macroporous weakly-basic anion exchangers, charged with palladium or platinum and based on crosslinked polystyrene, are used as catalysts.

In addition to the substantially improved thermal, mechanical and osmotic stability already mentioned, the catalyst resins used according to the invention have the following further properties which are important for the catalytic reduction of oxygen in aqueous media under industrial conditions:

1. They can be regenerated more easily than the strongly basic anion exchangers charged with palladium or platinum. Only the stoichiometric amount of alkali, instead of an excess of alkali, is required in order to convert the catalyst resin, present in the charged state in the salt form, into the amine form present in the regenerated state. In the amine form, the catalyst resin is virtually ion-free, since it cannot bond ions, and, as a result, cannot release ions to the aqueous medium to be treated. This freedom from ions of the catalyst resins to be used according to the invention is particularly important for the removal of oxygen from condensates and similar high-purity waters since, during their treatment, greatest importance is attached to ions not reaching the treated medium during the removal of the oxygen.

2. In contrast to the catalyst resins which contain palladium or platinum bonded to strongly-basic anion exchangers, the catalyst resins to be used according to the invention do not modify the ion composition of the aqueous salt solutions to be treated. Oxygen can be removed from aqueous salt solutions, for example heating circuit water, using the catalyst resins to be used according to the invention without the ion composition of the water being modified.

3. Since the catalytic activity of the catalyst resins to be used according to the invention is greater than that of catalyst resins which contain palladium or platinum bonded to strongly-basic anion exchangers, a significantly lower residual oxygen content in the aqueous liquid treated is achieved using them at a specified specific flow rate or, however, a higher specific flow rate, that is to say a higher throughput of the aqueous medium to be treated, is achieved at the pre-specified residual oxygen content.

The catalyst resins to be used according to the invention are employed in the same fashion as the catalyst resins used hitherto. The catalytic activity of the catalyst resins to be used according to the invention is independent of whether the amino groups of the weakly-basic anion exchanger are present in free form or in the salt form. Whether the catalyst resins to be employed according to the invention are employed in the form of free bases or in the salt form depends on the aqueous medium from which the oxygen is to be removed. On removal of oxygen from condensates and boiler feed waters, or, generally, aqueous media in which it is important that ions do not reach the treated medium on removal of the oxygen, the catalyst resins to be used according to the invention are employed in the form of their free base. On removal of oxygen from drinking water, sea water and brackish water, the resins may also be employed in their salt form.

The catalyst resins to be employed according to the invention may be prepared by processes which are known per se, for example by treatment of the weakly-basic anion exchanger with the aqueous solution of a complex salt which contains palladium or platinum in the form of an anionic complex, for example as $[PdCl_4]^-$ or $[PtCl_6]^{--}$. The metal ion, $Pd^{2+}$ or $Pt^{4+}$, is reduced, subsequent to the adsorption of the anionic metal complex by the anion exchanger, to the corresponding metals by treatment of the charged anion exchanger with reducing agents, such as hydrazine, formaldehyde, glucose etc.

The reverse procedure can also be carried out and the weakly-basic anion exchanger may initially be steeped in the solution of the reducing agent and then treated with the complex salt solution, and the metals precipitated in this fashion on the weakly-basic anion exchanger.

Finally, colloidally distributed, already reduced metal, for example palladium, may also be taken up adsorptively from an appropriate solution or suspension of the weakly-basic anion exchanger.

However, it has been shown that macroporous weakly-basic anion exchangers, charged with palladium or platinum and based on crosslinked polystyrene, which are particularly suitable for the catalytic reduction of oxygen in aqueous media are obtained when the weakly-basic anion exchangers are initially pretreated with dilute aqueous mineral acid, preferably dilute aqueous hydrochloric acid, and, only after this acid treatment, steeped in the aqueous solution of a complex salt of the catalytically active metal which contains the metal in the form of an anionic complex, and subsequently subjected to the reductive treatment.

It has been determined that, by means of this pretreatment with mineral acid, catalyst resins are obtained in which the catalytically active metal, particularly palladium, is bonded particularly strongly. In tests which simulate conditions in practice (charging with available chlorine and charging with 10% strength aqueous hydrochloric acid, as may be necessary on unintentional contamination, but also during purification and disinfectant treatments of the catalyst resins), it has been found that, on treatment of the catalyst resins to be used according to the invention with chlorine bleaching lye having a chlorine content of 3 mg/l of lye, at a specific flow rate of 10 bed volumes of lye/hour, the palladium loss of the resin after a throughput of 50 bed volumes of chlorine lye was only 4 and after a throughput of 500 bed volumes of chlorine bleaching lye only 10% by weight of the original amount of palladium present on the resin. After storing the catalysts to be used according to the invention, pretreated with acid during the preparation, for 24 hours in 2 bed volumes of 10% strength aqueous hydrochloric acid, the palladium loss was only 11% by weight of the original amount of palladium present on the catalyst resin.

The invention thus also relates to a process for the preparation of the catalyst resins to be used according to the invention which is characterized in that the macroporous, weakly-basic anion exchangers used as supports for the catalytically active metals, preferably palladium, are initially pretreated with dilute aqueous mineral acid, and the resin is only steeped in the aqueous solution of the complex salt of the catalytically active metal, which contains the metal in the form of an anionic complex, after this acid treatment, and is subsequently subjected to the reductive treatment.

The pretreatment, according to the invention, of the weakly-basic anion exchangers with aqueous mineral acids is carried out in such a fashion that the weakly-basic anion exchanger is suspended in the aqueous, 0.1% strength by weight to 30% strength by weight hydrochloric acid and the suspension is stirred at room temperature until the pH of the aqueous solution no longer changes. In general, 10 minutes to 3 hours are necessary for this, depending on the batch size.

The amount of aqueous hydrochloric acid for the pretreatment is calculated in such a fashion that 1 mol of amino groups in the anion exchanger are present to 0.1 to 3 mol of HCl, preferably 0.2 to 1.0 mol of HCl.

It has furthermore been found that the distribution of the metal in the anion exchanger particle can be adjusted by selecting the amount of acid in the pretreatment. Whereas an enrichment of the metal in the outer shell of the resin particle occurs when 0.1 to 0.3 mol of HCl are used per mol of amino groups in the weakly-basic anion exchanger, the use of 1.0 to 2.0 mols of HCl per mol of amino groups leads to an approximately homogeneous distribution of the metal over the entire cross-section of the resin particle. The use of 0.4 to 0.9 mol of HCl per mol of amino groups leads to a distribution of the metal in the resin particle which lies between the two above-mentioned extreme cases.

The weakly-basic anion exchangers, based on crosslinked polystyrene, which form the basis of the catalyst resins to be used according to the invention are crosslinked polystyrenes which contain primary, secondary or tertiary amino groups as functional groups. Those weakly-basic anion exchangers in which the polystyrene is crosslinked by 4-12% by weight of divinylbenzene, which contain 1.0-2.0 mol of primary, secondary and/or tertiary amino groups per litre of resin and whose average pore diameter is 50-1000 Å and whose internal surface area is 5-200 $m^2/g$ of resin are preferably used for the preparation of the catalyst resins to be used according to the invention.

The distribution of the metal within the catalyst resins is of great importance for the catalytic activity of the catalyst resins to be used according to the invention, since the distribution of the catalytically active metal in the resin particle influences the activity of the catalyst resin in the sense that the catalytic activity of the resin is at its greatest, at the given metal content, on enrichment of the metal in the outer shell of the resin particle, whereas a lower catalytic activity, but a longer life of the catalyst resin at the same specific flow rate, is obtained in the case of uniform distribution of the metal over the entire cross-section of the resin particle at the same metal content. The process according to the invention thus enables the activity of the catalyst resin to be matched to the respective intended use. This is of great industrial importance since the aqueous media to be freed of oxygen are aqueous solutions which are very differently composed. On the one hand, these are almost ion-free condensates and boiler feed waters; they are produced in large quantities and thus require a highly active catalyst resin which can be subjected to high kinetic and mechanical stress and, in addition, do not release any substances to the treated medium. On the other hand, there are the various kinds of water used in heating circuits; these kinds of water can have high temperatures and contain salts and additives. They primarily require catalyst resins which are thermally and chemically stable.

Although it is known, from U.S. Patent No. 4,111,895, that the penetration of the palladium into the resin particle can be controlled by addition of potassium chloride to the aqueous solution of the metal complex salt, this control of the palladium salt take-up by means of potassium chloride has, however, the disadvantage that it is influenced by many factors, for example concentration, flow and temperature, and is therefore easy to impair and difficult to reproduce. The pretreatment according to the invention of the weakly-basic anion exchangers with aqueous mineral acids is much less depedent on external factors and produces, in a simple fashion, a reproducible distribution of the metal in the resin particle.

Of the catalyst resins to be used according to the invention, only the macroporous weakly-basic anion exchangers, charged with palladium and platinum, which have a tertiary amino group as amino group are described. Surprisingly, it has been found that macroporous weakly-basic anion exchangers, charged with platinum or - preferably palladium, which contain a secondary of - preferably a primary amino group as amino group have a considerably greater catalytic activity in the catalytic reduction of oxygen in aqueous media than do the catalyst resins having a tertiary amino group.

The invention thus also relates to new macroporous weakly-basic anion exchangers, charged with platinum or preferably - palladium, based on crosslinked polystyrene, which are characterized in that the amino groups in the weakly-basic anion exchangers are secondary amino groups or - preferably - primary amino groups.

These new catalyst resins according to the invention are preferably macroporous, weakly-basic anion exchangers, charged with 0.01 - 10 g of palladium/litre of resin, based on polystyrene which is crosslinked with 4 - 12% by weight of divinylbenzene, containing 1.0 - 2 mol of primary amino groups per litre of resin and having an average pore diameter of 50 - 1000 Å and an internal surface area of 5 - 200 m$^2$/g of resin.

The support material, the macroporous weakly-basic anion exchangers, based on crosslinked polystyrene, having primary amino groups, and the preparation thereof from bead polymers of crosslinked polystyrene by chloromethylation and subsequent reaction with ammonia or by direct aminomethylation are known (see Ullmann, Enzyklopadie der technischen Chemie [Encyclopaedia of Industrial Chemistry], 4th edition, volume 13, pages 301-302).

EXAMPLE 1

100 ml of macroporous, weakly-basic anion exchangers, based on polystyrene which is crosslinked with 8% by weight of divinylbenzene (average pore diameter: 400 Å; internal surface area: 30 m$^2$/g of resin; total capacity for dimethylamino groups: 1.8 mol/litre of resin), are suspended in 130 ml of 1.15% strength aqueous HCl (0.23 mol of HCl/mol of amino groups). The suspension is stirred at room temperature until a constant pH is produced in the aqueous phase (pH 4.0 after 30 minutes).

The solution of 0.27 g of Na$_2$[PdCl$_4$]($=$0.1 g of Pd) in 10 ml of 0.01% strength HCl is subsequently added in portions, with stirring, to the suspension.

After each addition, the initially yellow-brown suspension becomes colourless within a few seconds and the initially pale beige resins gradually takes on a yellowish-pale brown colour. Palladium can no longer be detected in a sample of the supernatant colourless solution.

In order to reduce the divalent palladium to metallic palladium, a mixture of 25 ml of 20% strength NaOH and 2.5 ml of 20% strength hydrazine hydrate solution is added to the suspension with stirring. During this addition, the resin may very rapidly takes on a dark colour and the pH of the aqueous solution increases to 13.4.

The anion exchanger, charged with palladium, is then separated off, and washed initially with dilute NaOH/hydrazie solution (in order to reduce the chloride content of the resin) and subsequently with dimineralized water.

The catalyst resin obtained in this fashion is greybrown. Investigation by electron microscopy (X-ray microanalysis) of a thin section of a resin particle shows that over 80% of the palladium applied is located in a 10 μm thick layer on the surface of the resin particle.

EXAMPLE 2

The procedure as described in Example 1 is carried out, with the single difference that the pretreatment of the anion exchanger was carried out using 150 ml of 5% strength HCl (1.15 mol of HCl/mol of amino groups). A pH of 0.7 had been produced in the aqueous phase at the end of the pretreatment.

The resin, charged with Pd$^{2+}$, had a reddish-pale brown colour. A mixture of 120 ml of 20% strength NaOH and 2.5 ml of 20% strength hydrazine hydrate solution was used for the reduction. The pH of the reduction solution was 13.5.

The catalyst resin obtained in this fashion was coloured dark grey.

Investigation by electron microscopy of a thin section of a resin particle showed that the Pd is distributed essentially homogeneously over the resin cross-section (with decreasing concentraton towards the resin particle centre).

EXAMPLE 3

The procedure as described in Example 1 was carried out, but the pretreatment of the anion exchanger was carried out using 130 ml of 2.3% strength HCl (0.46 mol of HCl/mol of amino groups).

A mixture of 50 ml of 20% strength NaOH and 2.5 ml of 20% strength hydrazine hydrate solution was used for the reduction.

The colour of the catalyst resin obtained in this fashion was between the colours of the catalyst resins obtained in Examples 1 and 2. X-ray microanalysis of a thin section of a resin particle showed a palladium distribution within the resin particle which is between the distribution of the catalyst resins obtained according to Examples 1 and 2.

EXAMPLE 4

50 ml of macroporous weakly-basic anion exchanger, based on polystyrene which is crosslinked with 8% by weight of divinylbenzene (average pore diameter: 400 Å; internal surface area: 30 m$^2$/g; total capacity for aminomethyl groups: 2.5 mol/litre of resin), are suspended in 65 ml of 1.15% strength HCl (0.16 mol of HCl mol of amino groups). After stirring for 30 minutes, a pH of 7.3 has been produced in the aqueous phase of the suspension.

The solution of 0.13 g of Na$_2$[PdCl$_4$]($=$0.05 g of Pd) in 5 ml of approximately 0.1% strength HCl is added in portions, with stirring, to the suspension.

For the reduction of Pd$^{2+}$ to metallic Pd, a mixture of 2.5 ml of 20% strength NaOH and 1.25 ml of 20% strength hydrazine hydrate solution is added, with stirring, to the suspension. The initially beige resin takes on a brownish colour during this reduction. The X-ray microanalysis of a thin section of a resin particle showed that all the palladium is located in a 6 μm thick layer on the surface of the resin particle.

EXAMPLE 5

The procedure as described in Example 4 is carried out, but with the difference that the pretreatment of the anion exchanger is carried out using 75 ml of 5% strength HCl (0.8 mol of HCl/mol of amino groups). A constant pH of 4.5 was produced in the aqueous phase during the acid treatment.

The reduction was carried out using a mixture of 60 ml of 20% strength NaOH and 1.25 ml of 20% strength hydrazine hydrate solution. In contrast to Example 4, only a slight colour change of the resin occurred during the reduction. The X-ray microanalysis of a thin section of a resin particle showed a broader distribution of the palladium over the resin cross-section compared to Example 4.

The resin referred to as 'catalyst resin according to the state of the art' in the Examples 6, 7, 8 and 10 below is the catalyst resin Lewatit OC 1045 used hitherto for the reduction of oxygen in aqueous media. This catalyst resin is described in Examples 2 and 3 of EP-B-O No.,065,687 and is mentioned in EP-A-O No.,140,587 as the prototype of the catalyst resins used for the catalytic reduction of oxygen.

EXAMPLE 6

Stability test (mechanical and osmotic stability)
Description of the test:

The catalyst resin to be tested is placed in a filter tube (length: 700 mm, diameter: 15 mm) to a bed height of 50 cm. The resin is subsequently repeatedly subjected, at a constant pressure of 2.5 bar, to a charging cycle comprising the following part steps: charging with 0.5 N hydrochloric acid, rinsing with dimineralized water, charging with 0.5 N sodium hydroxide solution and rinsing with dimineralized water. HCl and NaOH are passed through the catalyst resin bed from the bottom to the top and the demineralized water is passed from the top to the bottom. As a result of the abruptly changing flow directions, the pressure on the resin bed is in each case suddenly released and, like a piston, the bed is forced upwards or downwards and forced against the respective filter base by the high flow rate of 100 - 200 m/h. The resin is thereby stressed mechanically. At the same time, a swelling (osmotic) shock occurs on each change of direction (liquid) caused by the very rapid replacement of acid or lye by demineralized water and vice versa.

The proportion of fragments, and thus the pressure in the filter column, increases with progressive destruction of the catalyst resin, caused by the mechanical and osmotic load. As a result, the flow rate is reduced at a constant admission pressure of 2.5 bar. The flow rate is used as a measure of the stability of the resin.

In the following table, the results obtained in the investigation of the catalyst resin according to Example 1 and the catalyst resin according to the state of the art (flow rates against number of charging cycles) are collated.

The excellent mechanical and osmotic stability of the catalyst resin, to be used according to the invention, according to Example 1 can be seen from the data given in Table 1. The catalyst resin, to be used according to the invention, obtained according to Examples 2, 4 and 5 have a comparable mechanical and osmotic stability.

EXAMPLE 7 (Test for determination of the thermal stability)

Description of the test:

41 - 42 ml of the catalyst resin to be investigated are introduced into a 45 ml miniature autoclave which is clad with Teflon. The spaces between the resin beads are filled with demineralized water. The autoclave is subsequently sealed and heated to the reaction temperatures specified in Table 2 below for the reaction times likewise specified in Table 2. The volume of the catalyst resin before and after heating (volume b.h. and volume a.h.), the HCl index [mol/litre of resin]before and after heating (HCl index b.h. and HCl index a.h.) and the total absorption capacity of the catalyst resin before and after heating (total capacity b.h. and a.h.) are determined. The extent to which the resin is degraded during the heat treatment is given by the difference between the volume before and after heating, the HCl index before and after heating and the total adsorption capacity before and after heating.

The values specified in the table show that the catalyst resin according to Example 2 was degraded to a substantially lesser extent during the temperature treatment than the catalyst resin according to the state of the art.

Comparable results were also obtained using the catalyst resins described in Examples 1, 4 and 5.

EXAMPLE 8 (Determination of the catalytic activity of the catalyst resins)

Description of the test:

30 ml of catalyst resin of the uniform particle fraction 0.5 - 1.0 mm are placed in a glass column (0: 22 mm). Demineralized water, saturated with oxygen, containing 11.6 - 12.0 ppm of hydrazine is pumped through this resin bed from the top to the bottom at 19°-20° C. The residual oxygen content in the water flowing out of the resin bed is measured at different weight hourly space velocities using a commercially available oxygen measuring device. The residual $O_2$ contents found for the catalyst resins investigated at the specified specific flow rates are collated in Table 3 below.

EXAMPLE 9

The catalyst resins described in Examples 4 and 5 were subjected to the activity test described in Example 8. The hydrazine content of the demineralized water, saturated with $O_2$ at 19°-20° C., was, however, only 10.2 ppm. The residual $O_2$ contents in the discharging water are collated in Table 4 below for the two investigated catalyst resin at the specified specific flow rates.

EXAMPLE 10 (Determination of the washout behaviour of the catalyst resins)

Description of the method:

300 ml of the catalyst resin to be investigated are placed in a heatable laboratory filterand hot, fully demineralized water, 90°-98° C., is passed through. (Specific flow rate 50 bed volumes/hour). Downstream of the filter, the water is cooled to room temperature and passed through a conductivity measuring cell. The conductivity values found using the two investigated catalyst resins after the various throughputs are collated in Table 5 below:

It can be seen from the table that the ions released to the treated water by catalyst resin described in Example 1 are only a fraction of those which are released to the treated water by the catalyst resin according to the state of the art.

Virtually the same conductivity values are obtained using the catalyst resins according to Examples 2, 4 and 5 as are obtained using the catalyst resin according to Example 1.

What is claimed is:

1. In the process for the removal of oxygen from aqueous media by catalytic reduction of the oxygen with the use of an anion exchanger which is charged with palladium or platinum and is based on crosslinked polystyrene as a catalyst, the improvement which comprises using as the catalyst a macroporous weakly basic anion exchanger charged with palladium or platinum and based on crosslinked polystyrene, which resin has been prepared by pretreating a macroporous, weakly-basic anion exchanger with a dilute aqueous mineral acid, steeping the pretreated anion exchanger in an aqueous solution of a complex salt of palladium or platinum which contains the metal in the form of an anionic complex, and subjecting the anion exchanger to reductive treatment.

2. The process of claim 1, wherein the reductive treatment is effected with hydrogen, hydrazine or hypophosphite.

3. The process of claim 1, wherein the macroporous weakly-basic anion exchanger charged with palladium or platinum contains 1.0 - 2.0 mol of primary, secondary or tertiary amino groups per litre of resin, has an average pore diameter of 50 - 1000 A and an internal surface area of 5 - 200 m²/g of resin and is based on a polystyrene which is crosslinked by 4 - 12% by weight of divinylbenzene.

4. The process of claim 3, wherein the macroporous weakly-basic anion exchanger is charged with palladium.

5. A process for the preparation of a catalyst resin comprising pretreating a macroporous, weakly-basic anion exchanger with a dilute aqueous mineral acid, steeping the pretreated anion exchanger in an aqueous solution of a complex salt of palladium or platinum which contains the metal in the form of an anionic complex, and subjecting the anion exchanger to reductive treatment.

6. The process of claim 5, wherein dilute, aqueous hydrochloric acid is used for the pretreatment.

7. The process of claim 6, wherein the amount of aqueous hydrochloric acid is calculated so that 0.1 - 3 mol of HCl are present per mol of amino groups in the anion exchanger.

8. The process of claim 5, wherein a 0.1% - 30% strength by weight aqueous hydrochloric acid is used for the pretreatment.

9. A catalyst resin comprising a macroporous weakly-basic crosslinked anion exchanger charged with 0.01 - 10 g of palladium per litre of resin carrying 1.5-3 mols of primary amino groups per litre of resin, having an average pore diameter of about 400 A and an internal surface area of about 30 to 200 square meters/gram, and being based on polystyrene which has been crosslinked with about 8% by weight of divinylbenzene, the resin having been prepared by pretreating a macroporous, weakly-basic anion exchanger with a dilute aqueous mineral acid, steeping the pretreated anion exchanger in an aqueous solution of a complex salt of palladium which contains the metal in the form of an anionic complex, and subjecting the anion exchanger to reductive treatment.

* * * * *